(12) United States Patent
Kim et al.

(10) Patent No.: US 7,116,723 B2
(45) Date of Patent: Oct. 3, 2006

(54) CLOSED LOOP TRANSMIT DIVERSITY METHOD AND APPARATUS USING COMPLEX BASIS VECTOR SETS FOR ANTENNA SELECTION

(75) Inventors: Sung-jin Kim, Suwon (KR);
Kwang-bok Lee, Seoul (KR);
Hyeon-woo Lee, Suwon (KR);
Keun-chul Hwang, Kwangju (KR);
Ho-kyu Choi, Seongnam (KR);
Yong-suk Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 629 days.

(21) Appl. No.: 09/909,858

(22) Filed: Jul. 23, 2001

(65) Prior Publication Data

US 2002/0018530 A1  Feb. 14, 2002

(30) Foreign Application Priority Data

Jul. 21, 2000  (KR) .............................. 2000-41918

(51) Int. Cl.
*H04B 7/02*  (2006.01)

(52) U.S. Cl. ...................... 375/267; 375/299; 375/347; 375/260; 343/853; 455/69; 370/204

(58) Field of Classification Search ................ 375/267, 375/299, 260, 347; 343/853; 455/69; 370/204
See application file for complete search history.

(56) References Cited

U.S. PATENT DOCUMENTS

| | | | |
|---|---|---|---|
| 5,471,647 A | 11/1995 | Gerlach et al. | |
| 5,634,199 A | 5/1997 | Gerlach et al. | |
| 5,987,076 A | 11/1999 | Zehavi et al. | |
| 6,185,258 B1 * | 2/2001 | Alamouti et al. | ........... 375/260 |
| 6,317,411 B1 * | 11/2001 | Whinnett et al. | ........... 370/204 |
| 6,542,556 B1 * | 4/2003 | Kuchi et al. | ................. 375/299 |
| 6,766,146 B1 * | 7/2004 | Park et al. | ..................... 455/69 |
| 6,775,329 B1 * | 8/2004 | Alamouti et al. | ........... 375/267 |

(Continued)

FOREIGN PATENT DOCUMENTS

EP  0 755 127 A2  1/1997

(Continued)

OTHER PUBLICATIONS

Hottinen et al.; Transmit Diversity using Filtered Feedback Weights in the FDD /WCDMA System; International Zurich Seminar on Broadband Communications Proceedings; 2000 IEEE; Feb. 2000; pp. 15-21.*

(Continued)

*Primary Examiner*—Emmanuel Bayard
*Assistant Examiner*—Sudhanshu C. Pathak
(74) *Attorney, Agent, or Firm*—Lee & Morse, P.C.

(57) ABSTRACT

A transmission antenna diversity method, and a base station apparatus and a mobile station apparatus therefor in a mobile communication system are provided. In the transmission antenna diversity method, channel information is measured from signals received through the plurality of antennas used in the base station, and a channel information matrix is output. The channel information matrix is transformed according to a transform matrix composed of a complex basis vector set. Reception power with respect to the plurality of antennas is calculated based on the transformed channel information matrix. Antenna selection information obtained based on the calculated reception power is transmitted to the base station as feedback information for controlling transmission antenna diversity. Therefore, power is equally distributed to transmitting antennas, excellent performance is maintained at a high speed of movement, and reliable channel adaptation is accomplished at a low speed of movement of the mobile station.

19 Claims, 8 Drawing Sheets

| INDEX | VECTOR | INDEX | VECTOR |
|---|---|---|---|
| 0 | $[1-j \quad 1+j \quad 1+j \quad 1+j]$ | 8 | $[1+j \quad 1+j \quad 1-j \quad 1+j]$ |
| 1 | $[1-j \quad -1+j \quad 1+j \quad -1+j]$ | 9 | $[1+j \quad -1+j \quad 1-j \quad -1+j]$ |
| 2 | $[1-j \quad 1+j \quad -1+j \quad -1+j]$ | 10 | $[1+j \quad 1+j \quad -1-j \quad -1+j]$ |
| 3 | $[1-j \quad -1+j \quad -1+j \quad 1+j]$ | 11 | $[1+j \quad -1+j \quad -1-j \quad 1+j]$ |
| 4 | $[1+j \quad 1-j \quad 1+j \quad 1+j]$ | 12 | $[1+j \quad 1+j \quad 1+j \quad 1-j]$ |
| 5 | $[1+j \quad -1-j \quad 1+j \quad -1+j]$ | 13 | $[1+j \quad -1+j \quad 1+j \quad -1-j]$ |
| 6 | $[1+j \quad 1-j \quad -1+j \quad -1+j]$ | 14 | $[1+j \quad 1+j \quad -1+j \quad -1-j]$ |
| 7 | $[1-j \quad -1-j \quad -1+j \quad 1+j]$ | 15 | $[1+j \quad -1+j \quad -1+j \quad 1-j]$ |

U.S. PATENT DOCUMENTS

2001/0038356 A1* 11/2001 Frank .................. 343/853
2002/0009156 A1* 1/2002 Hottinen et al. ............ 375/267

FOREIGN PATENT DOCUMENTS

| EP | 0 755 127 A3 | 1/1997 |
| EP | 0 838 911 A2 | 4/1998 |
| WO | WO 01/22619 A1 | 3/2001 |

OTHER PUBLICATIONS

Hottinen et al.; Soft-Weighted Transmit Diversity for WCDMA; Preceeding on Allerton Conference Communication; Sep. 1999; pp. 1-10.*

Paulraj et al.; A Simple Scheme for Transmit Diversity Using Partial Channel Feedback; 1998 IEEE; pp. 1073-1078.*

* cited by examiner

FIG. 5A

| INDEX | VECTOR |
|---|---|
| 0 | [ 1  1  1  1 ] |
| 1 | [ 1 −1  1 −1 ] |
| 2 | [ 1  1 −1 −1 ] |
| 3 | [ 1 −1 −1  1 ] |

FIG. 5B

| INDEX | VECTOR |
|---|---|
| 0 | [ −1  1  1  1 ] |
| 1 | [  1 −1  1 −1 ] |
| 2 | [  1  1 −1 −1 ] |
| 3 | [  1 −1 −1  1 ] |

FIG. 5C

| INDEX | VECTOR | | | | INDEX | VECTOR | | | |
|---|---|---|---|---|---|---|---|---|---|
| 0 | [1−j | 1+j | 1+j | 1+j] | 8 | [1+j | 1+j | 1−j | 1+j] |
| 1 | [1−j | 1+j | −1+j | −1+j] | 9 | [1+j | 1+j | 1−j | −1+j] |
| 2 | [1−j | 1+j | 1+j | −1+j] | 10 | [1+j | 1+j | −1−j | −1+j] |
| 3 | [1−j | 1+j | −1+j | 1+j] | 11 | [1+j | 1+j | −1−j | 1+j] |
| 4 | [1+j | 1−j | 1−j | 1+j] | 12 | [1+j | −1+j | 1+j | 1−j] |
| 5 | [1+j | 1−j | 1−j | −1+j] | 13 | [1+j | −1+j | 1+j | −1−j] |
| 6 | [1+j | 1−j | −1−j | −1+j] | 14 | [1+j | −1+j | −1+j | −1−j] |
| 7 | [1−j | −1−j | −1−j | 1+j] | 15 | [1+j | −1+j | −1+j | 1−j] |

FIG. 6

| SLOT NUMBER | 0 | 1 | 2 | 3 | ... | 14 | 15 |
|---|---|---|---|---|---|---|---|
| FSM 00 | bw(0) | bp(0) | bw(0) | bp(0) | ... | bw(0) | bp(0) |
| 01 | bw(1) | bp(1) | bw(1) | bp(1) | ... | bw(1) | bp(1) |
| 10 | bw(2) | bp(2) | bw(2) | bp(2) | ... | bw(2) | bp(2) |
| 11 | bw(3) | bp(3) | bw(3) | bp(3) | ... | bw(3) | bp(3) |

FIG. 7

| PARAMETER | VALUE | TYPE |
|---|---|---|
| NUMBER OF ANTENNAS | $N_{ant} = 4$ | CONSTANT |
| DURATION TIME IN A SLOT | $T_{slot} = 1/1500$ sec | |
| NUMBER OF BASIS SETS FOR BASIS ROTATION | $N_{set} = 2$ | |
| FEEDBACK COMMAND LENGTH IN SLOTS | $N_W = 2$ | VARIABLE |
| NUMBER OF SELECTION INDEX BITS PER SIGNALING WORD | $N_{set} = \log_2 N_{ant} = 2$ | |
| NUMBER OF FEEDBACK INFORMATION BITS PER SLOT | $N_{FBD} = N_{set}/1 = 2$ | |
| FEEDBACK COMMAND UPDATE RATE | $F_{up} = (N_{FBD}/N_W)T_{slot} = 1500Hz$ | |
| FEEDBACK BIT RATE | $N_{FBD}/T_{slot} = 3000bps$ | |

CLOSED LOOP TRANSMIT DIVERSITY METHOD AND APPARATUS USING COMPLEX BASIS VECTOR SETS FOR ANTENNA SELECTION

BACKGROUND OF THE INVENTION

1. Field of the Invention

The present invention relates to transmission antenna diversity, and more particularly, to a transmission antenna diversity method, and a base station apparatus and a mobile station apparatus therefor in a mobile communication system.

2. Description of the Related Art

Third generation mobile communication systems have standards for transmitting data at a higher rate than second generation mobile communication systems represented by personal communication systems (PCS). In Europe and Japan, a synchronous Wideband Code Division Multiple Access (W-CDMA) mode is adopted as a wireless access standard. In North America, an asynchronous CDMA-2000 mode is adopted as a wireless access standard. Mobile communication systems are configured so that many mobile stations can communicate through a single base station.

It is necessary to overcome fading in order to transmit data at a high rate in a mobile communication system. Fading reduces the amplitude of a received signal by several decibels to several tens of decibels. A variety of diversity techniques are used to satisfactorily overcome fading. In a CDMA mode, a delay spread of a channel is employed. A reception diversity technique of receiving a multi-path signal is applied to a Rake receiver. This reception diversity technique has a problem in that reception diversity does not operate well when delay spread is small. A time diversity technique using interleaving and coding is used in a Doppler spread channel. It is difficult to use this method in a low-speed Doppler channel.

Space diversity is used to overcome fading in an indoor channel having small delay spread and an outdoor channel which is a low-speed Doppler channel. Space diversity uses two or more antennas. In this method, when a signal transmitted through one antenna is reduced due to fading, a signal transmitted through another antenna is used for reception. Space diversity is divided into reception antenna diversity using receiving antennas and transmission antenna diversity using transmitting antennas. It is difficult to install reception antenna diversity in a mobile station because of lack of space and excessive cost, so it is recommended to use transmission antenna diversity in a base station.

Conventional transmission antenna diversity can be a closed loop transmission, wherein up-link channel information is fed back from a mobile station or it can be an open loop transmission diversity, wherein feedback is not sent from a mobile station. When using L antennas, closed loop transmission diversity has L times greater gain than open loop transmission diversity in terms of a Signal to Interference and Noise Ratio (SINR). However, the performance of closed loop transmission diversity of feeding back channel information for operation is influenced by the period available for feedback. When the feedback period is long, a channel may change before feedback information reaches a base station, thereby degrading the performance. Further, when a large amount of information is fed back per unit time in order to track a rapidly changing channel, the up-link capacity decreases.

In addition, transmission antenna diversity is divided into a maximal ratio combining (MRC) method, an equal gain combining (EGC) method, and a selective combining (SC) method. When a feedback bandwidth is not satisfactorily secured, the performance of the above-described closed loop transmission antenna diversity may be degraded because a change in channel information is not reliably reflected in the feedback information signal. Thus, in order to have channel information that is rapidly and reliably reflected in the feedback information signal, closed loop transmission antenna diversity employing an SC method is typically used.

However, when using an SC method, unbalance between antennas can occur, causing additional costs to configure a radio frequency (RF) processor. Therefore, diversity using an SC method for overcoming the above problem and performing diversity using less feedback information is desired.

Although diversity gain can be obtained, a SINR gain increase causes an attendant decrease in diversity when using an SC method compared to diversity using an MRC method or an EGC method because channel information is not completely indicated in the feedback information. Therefore, an improved diversity method is desired that can maximize SINR gain by compensating for the decrease, can be applied at a high moving speed, and can simplify the hardware configuration of a transceiver.

A transmission antenna diversity method using a feedback mode is disclosed in U.S. Pat. Nos. 5,634,199 and 5,471,647. In these patents, measurement of a channel and a feedback method using a perturbation algorithm and a gain matrix are proposed. However, these patents adopt a blind method, which is slow to converge in measuring a channel and is not effective in finding an exact weight. Thus, the method is not frequently used in systems that use a pilot signal.

In Universal Mobile Telecommunication Service (UMTS) W-CDMA (3GPP) standards, Motorola proposes a method of quantizing a weight for each antenna in a feedback mode. In addition, Nokia and others propose a transmission antenna diversity method for high-speed mobile objects operating with respect to two antennas. However, these methods are optimized for a case of using two antennas. Therefore, an improved method of effectively selecting many antennas is desired.

SUMMARY OF THE INVENTION

To solve the above-described problems, a feature of an embodiment of the present invention is to provide a closed loop transmission antenna diversity method using a selective combining (SC) method, which can overcome an imbalance of power between antennas by providing feedback information for selecting an antenna using a complex basis vector set in extending antenna selection to basis vector selection.

It is another feature of the present invention to provide a base station apparatus and a mobile station apparatus for performing the above closed loop transmission antenna diversity method using a SC method.

In an embodiment of the present invention, a closed loop transmission antenna diversity method employing a selective combining method includes (a) measuring channel information from signals transmitted from a plurality of antennas used in a base station and outputting a channel information matrix; (b) transforming the channel information matrix according to a transform matrix composed of a complex basis vector set; (c) calculating reception power with respect to the plurality of antennas based on the transformed channel information matrix; (d) obtaining transmitting antenna selection information based on the calculated reception power; and (e) transmitting the antenna selection information to the base station as feedback information for controlling transmission antenna diversity.

In another embodiment, a closed loop transmission antenna diversity method employing a selective combining method comprises the steps of (a) receiving a selection information signal related to a complex basis vector from a mobile station as feedback information for controlling transmission antenna diversity; (b) determining a complex basis vector selected based on the selection information; (c) obtaining an antenna weight for each antenna using the determined complex basis vector; (d) generating a signal based on the antenna weight; and (e) transmitting the signal to the mobile station through a corresponding antenna.

In yet another embodiment of the present invention, a base station apparatus comprises a plurality of antennas for receiving a selection information signal related to a complex basis vector from a mobile station as feedback information for controlling transmission antenna diversity, a feedback information decoder for determining a complex basis vector selected based on the received selection information and for obtaining an antenna weight for each antenna using the determined complex basis vector, and a data transmitting unit for generating a signal based on the antenna weight and for transmitting the signal to the mobile station through a corresponding antenna.

In still another embodiment of the present invention, a channel information measuring unit in a receiving mobile station apparatus measures signals transmitted from a plurality of antennas in a base station and creates a channel information matrix which is processed by a basis vector transformer to transform the channel information matrix according to a transform matrix composed of a complex basis vector set, after which an optimum weight detector calculates reception power with respect to the plurality of antennas based on the transformed channel information matrix, after which a feedback information signal generator for controlling transmission antenna diversity based on the calculated reception power, and to an uplink signal processor for transmitting the feedback information to the base station in the form of a symbol configured according to a protocol suitable for feedback.

These and other features of the present invention will be readily apparent to those of ordinary skill in the art upon review of the detailed description that follows.

BRIEF DESCRIPTION OF THE DRAWINGS

FIGS. 5A through 5C show examples of a basis vector set on a real axis, a basis vector set on an imaginary axis, and a complex basis vector set obtained by combining the two real and imaginary basis vector sets.

FIG. 6 shows the mapping relation between a basis vector and feedback information at each slot number.

FIG. 7 shows parameters and their values used for transmission antenna diversity employing a selection method using complex basis vectors when four antennas are used.

DETAILED DESCRIPTION OF THE INVENTION

Figure 1:
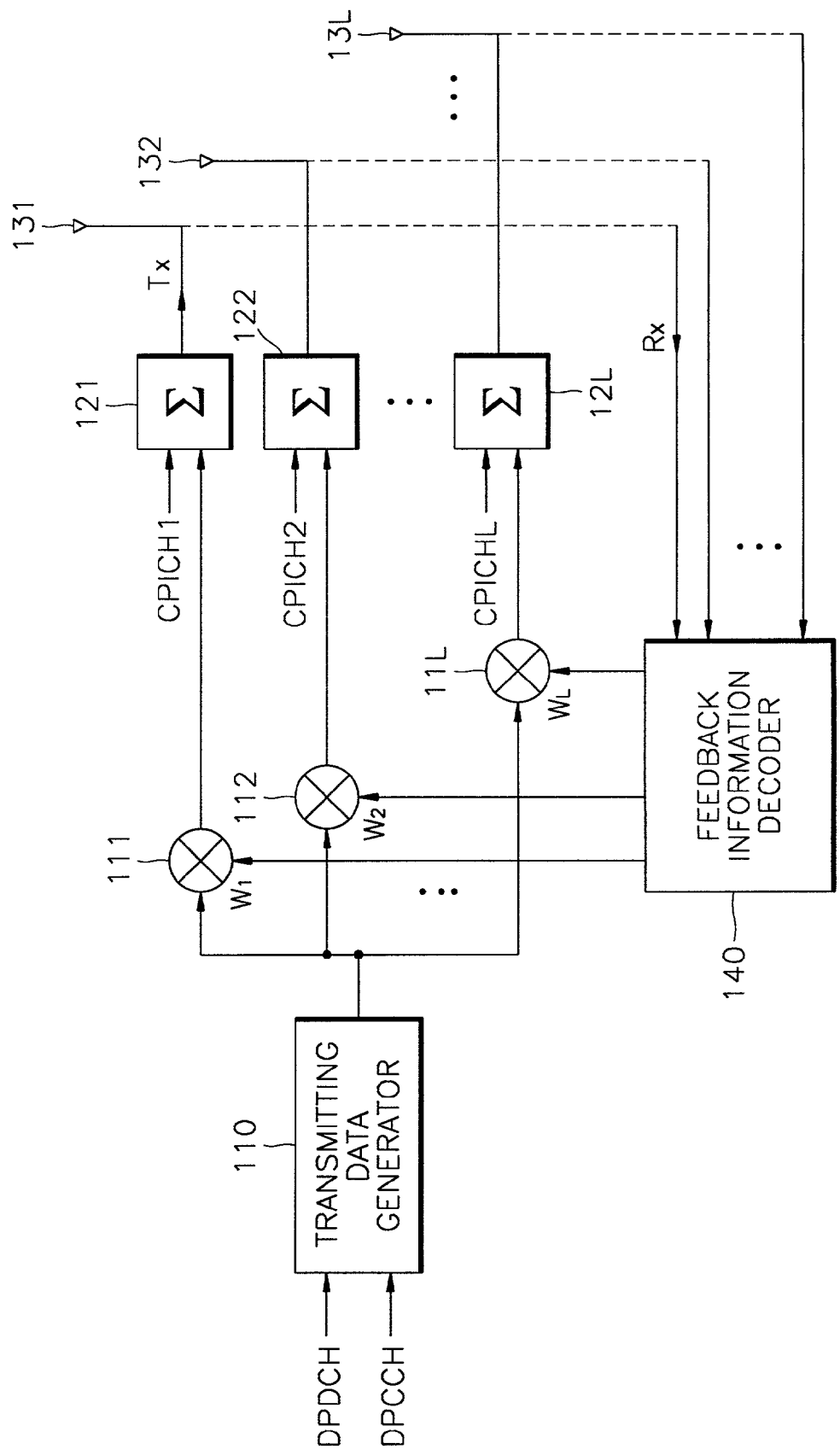
FIG. 1 illustrates a block diagram of a transmitting apparatus for transmission antenna diversity in a wireless communication system.

Korean Patent Application No. 2000-41918, filed on Jul. 21, 2000, and entitled: "Transmission Antenna Diversity Method, Base Station Apparatus and Mobile Station Apparatus Therefore in Mobile Communication System," is incorporated by reference herein in its entirety.

The operating principle of the present invention will now be briefly described. The present invention employs a selective combining (SC) method for closed loop transmission antenna diversity in a wireless transmit-receive system. In the case of transmission antenna diversity in which a transmitter transmits a signal through a plurality of antennas, the SC method simplifies hardware configuration. However, due to the imbalance of power between antennas, cost for configuring a radio frequency (RF) processor increases. To overcome this problem, a selection of an antenna is extended to a selection of a basis vector. In selection of the basis vector, by using an equal power balanced basis vector allowing antennas to have the same power, the imbalance of power between antennas can be overcome even if diversity employing the SC method is used.

A basis vector set, {[1 0 0 0], [0 1 0 0], [0 0 1 0], [0 0 0 1]}, may be used to select an antenna in a receiver. This set is an unequal power balanced basis vector set. Equal power balanced basis vector sets are a Walsh basis vector set, {[1 1 1 1], [1 −1 1 −1], [1 1 −1 −1], [1 −1 −1 1]}, and a polar basis vector set, {[−1 1 1 1], [1 −1 1 1], [1 1 −1 1], [1 1 1 −1]}.

These basis vector sets used for the SC method are composed of the same constants so that the inner product of different vectors is 0, and the inner product of the same vectors is not 0. When these basis vector sets are used to obtain weights for antennas, vectors are equalized so that the constant can be 1 in order not to change transmission power. Such an equalized set is referred to as an orthonormal basis vector set.

For reference, since a method of using an equal power balanced orthonormal basis vector set in reception antenna diversity comes under diversity based on an SC method, the performance of the method is the same as that of a method using an unequal power balanced orthonormal basis vector set. When it is assumed that diversity information is ideally set back, both methods have the same performance in transmission antenna diversity, with the exception that power is uniform among transmitting antennas in the method of using an equal power balanced orthonormal basis vector set.

In closed loop transmission antenna diversity configured so that diversity information is fed back from a mobile station, transmission of feedback information is delayed as the moving speed of a mobile station increases because the bandwidth of a feedback channel is limited. This delay decreases diversity gain. As compared to an SC method, a maximal ratio combining (MRC) method or an equal gain combining (EGC) method has a large amount of feedback information so that accurate channel compensation can be performed at a low moving speed, thereby increasing the performance, but the performance rapidly decreases as the moving speed of the mobile station increases.

The present invention provides a complex basis vector selection method for improving the performance of diversity using an SC method at a low moving speed and maintaining the performance as the moving speed increases. A complex basis vector set is composed of different orthonormal sets assigned to the real axis and the imaginary axis of the complex plane. For example, a Walsh basis vector set is assigned to a real axis, and a polar basis vector set is assigned to an imaginary axis. When four antennas are used, a complex basis vector set composed of 16 vector combinations is obtained. Selecting one complex basis vector from the complex basis vector set determines which antenna is to be given a weight among a plurality of antennas.

When information related to selection of a complex basis vector is fed back to a base station from a mobile station, vector information as to a real axis and an imaginary axis is alternately transmitted at feedback signalling intervals. The base station sums the information received during two consecutive feedback signalling intervals by way of a sliding window and forms a complex basis vector. For example, when feedback information is transmitted in order of real axis information and imaginary axis information, one basis vector is constituted by the first real axis information and the second imaginary axis information, and then the next basis vector is constituted by the second imaginary axis information and the third real axis information, thereby forming a complex basis vector by way of sliding window. Each factor of the complex basis vector is used as a weight for each antenna. By configuring transmission antenna diversity as described above, optimum feedback information can be used at feedback signalling intervals. Since an optimum weight can be used at feedback signalling intervals, excellent characteristics are maintained at a high moving speed, and the performance is improved at a low moving speed as the resolution of the complex basis vector is increased to 1/16. Furthermore, the complex basis vector set is formed to equalize power among antennas, thereby preventing an imbalance of power among the antennas.

Hereinafter, the configurations and operations of a transmitting apparatus and a receiving apparatus according to a preferred embodiment of the present invention will be described. FIG. 1 is a block diagram of a transmitting apparatus for transmission antenna diversity in a wireless communication system. The transmitting apparatus corresponds to a base station in a mobile communication system and can be referred to as a UMTS (Universal Mobile Telecommunication Service) Terrestrial Radio Access Network (UTRAN).

Referring to FIG. 1, the transmitting apparatus includes a transmitting data generator 110, L (two or more) multipliers 111 through 11L, L adders 121 through 12L, L antennas 131 through 13L, and a feedback information decoder 140. The transmitting data generator 110 generates and outputs data to be transmitted to the L multipliers 111 through 11L. Specifically, the transmitting data generator 110 receives, for example, a signal DPDCH of a dedicated physical data channel and a signal DPCCH of a dedicated physical control channel, and multiplexers these signals to generate and output transmitting data.

The L multipliers 111 through 11L multiply the data output from the transmitting data generator 110 by weights $w_1$ through $w_L$ corresponding to the respective antennas 131 through 13L. The L adders 121 through 12L add the pilot signals CPICH1 through CPICHL corresponding to the respective antennas 131 through 131L to the outputs of the corresponding L multipliers 111 through 11L, respectively. The signals generated by the L adders 121 through 12L are forwarded through the corresponding L antennas 131 through 13L, respectively, via a radio frequency (RF) signal processor (not shown).

Here, the antenna weights $w_1$ through $w_L$ are obtained through the operation of the feedback information decoder 140 analyzing feedback information received through the L antennas 131 through 13L. Feedback information is uplinked from a receiving apparatus (that is, an arbitrary i-th mobile station). Practically, the L antennas 131 through 13L receive as feedback information an index indicating one element (i.e., one complex basis vector) of a complex basis vector set. This will be described in detail later.

The feedback information decoder 140 selects a complex basis vector corresponding to the index received as feedback information. Factors of the selected complex basis vector are output as weights corresponding to the respective L antennas 131 through 13L.

Figure 2:
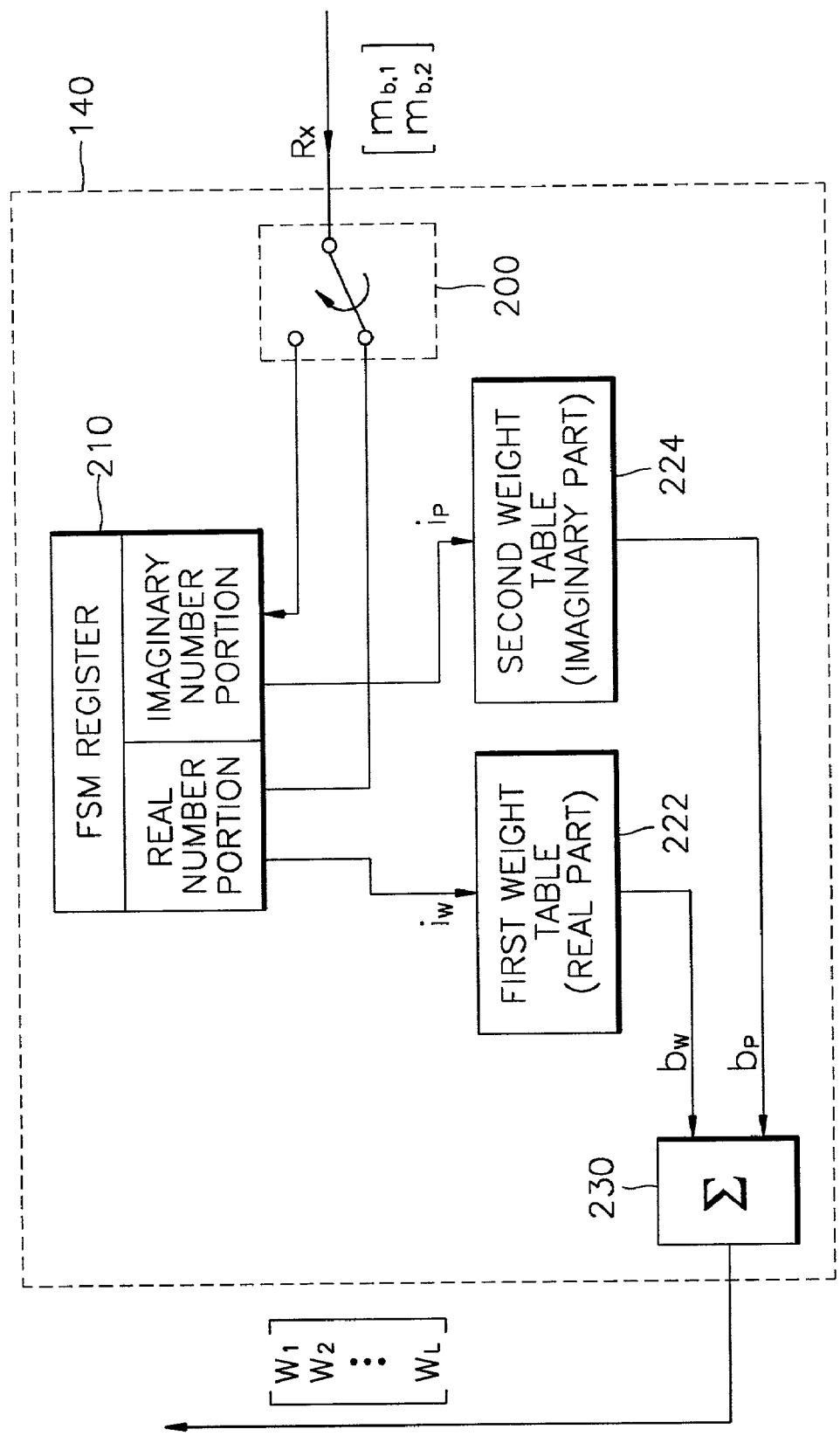
FIG. 2 illustrates a block diagram of an embodiment of the feedback information decoder shown in FIG. 1.

FIG. 2 is a block diagram of an embodiment of the feedback information decoder 140 shown in FIG. 1. The feedback information decoder 140 includes a switching unit 200, a feedback signaling message (FSM) register 210, first and second weight tables 222 and 224, and an adder 230.

The switching unit 200 operates according to whether the slot number of a received signal is even or odd so that feedback information can be stored in a real number portion of the FSM register 210 when the slot number is even and in an imaginary number portion of the FSM register 210 when the slot number is odd. Here, the feedback information signal is an index representing one basis vector in a first orthonormal basis vector set, i.e., a real part, or an index representing one basis vector in a second orthonormal basis vector set, i.e., an imaginary part. When each basis vector set is composed of four basis vectors, a feedback signalling vector [mb, 1, mb,2]T transmitted from a mobile station to a base station is represented by 2-bit binary data expressing an index indicating a basis vector.

The FSM resistor 210 outputs an index $i_w$, which will be input to the first weight table (i.e., a look-up table) 222, using feedback information (e.g., an index represented by two bits) stored in the real number portion, and an index ip, which will be input to the second weight table 224, using feedback information (e.g., an index represented by two bits) stored in the imaginary number portion.

The first weight table 222 outputs a basis vector $b_w$ on a real axis corresponding to the index $i_w$, and the second weight table 224 outputs a basis vector $b_p$ on an imaginary axis corresponding to the index $i_p$. In the first weight table 222, each element of a Walsh basis vector set is assigned an index (see FIG. 5A). In the second weight table 224, each element of a polar basis vector set is assigned an index (see FIG. 5B). The adder 230 sums the real basis vector $b_w$ and the imaginary basis vector $b_p$ and outputs an antenna weight vector [w1, w2, . . . , wL].

Briefly, the feedback information decoder 140 according to an embodiment of the present invention alternately stores feedback information in the real number portion and the imaginary number portion at feedback signaling intervals, sums the feedback information by way of sliding window, and obtains the antenna weight vector [w1, w2, . . . , wL] based on the summed feedback information.

Figure 3:
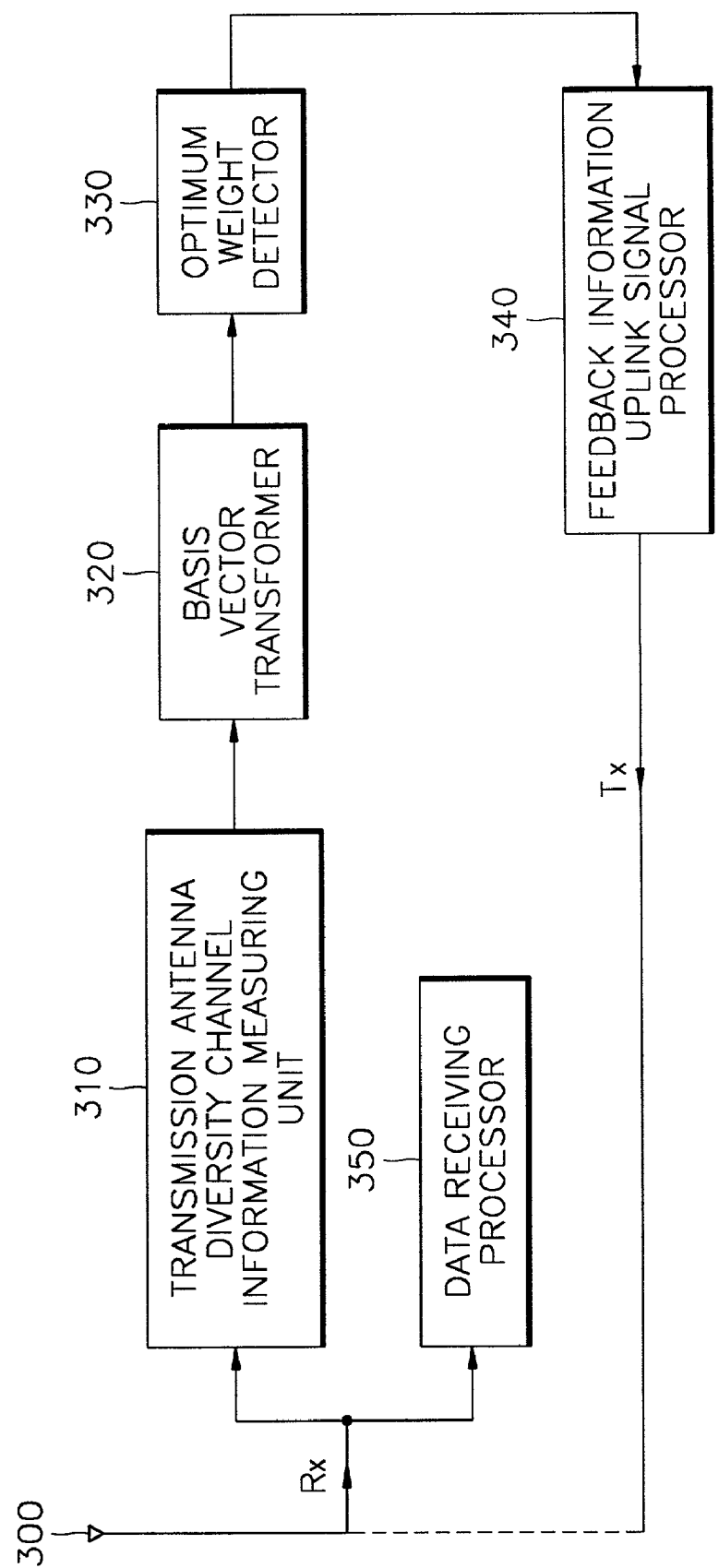
FIG. 3 illustrates a block diagram of a receiving apparatus for transmission antenna diversity in a wireless communication system.

FIG. 3 is a block diagram of a receiving apparatus for transmission antenna diversity in a wireless communication system. Specifically, FIG. 3 shows an antenna weight measuring apparatus for measuring an antenna weight in the receiving apparatus.

Referring to FIG. 3, the receiving apparatus includes an antenna 300, a transmission antenna diversity channel information measuring unit 310, a basis vector transformer 320, an optimum weight detector 330, a feedback information uplink signal processor 340, and a data receiving processor 350. The data receiving processor 350 usually decodes a signal received through the antenna 300 and restores transmitting data.

The transmission antenna diversity channel information measuring unit 310 measures channel information from a signal received through the antenna 300 and outputs the result in the form of a matrix. The output channel information matrix is composed of L*M elements. "L" denotes the number of antennas, and "M" denotes the number of multi-path channels for each antenna. According to the description of FIG. 1, a transmitting apparatus transmits different pilot signals for each antenna to allow a receiving apparatus to discriminate between the antennas. The receiving apparatus measures each channel signal using a unique pilot signal corresponding to each of multiple antennas.

The basis vector transformer 320 transforms the channel information matrix output from the transmission antenna diversity channel information measuring unit 310 using a transform matrix composed of a complex basis vector set. The optimum weight detector 330 detects an element (i.e., a weight for maximizing a received SINR) of the complex basis vector set at which reception power with respect to the multiple antennas is maximized, using the transformed channel information matrix.

The feedback information uplink signal processor 340 transmits the result of the detection as feedback information for controlling transmission antenna diversity to the transmitting apparatus through the antenna 300. Here, the feedback information uplink signal processor 340 transforms the feedback information into a symbol according to a protocol suitable for feedback before transmitting the feedback information.

In a transmission antenna diversity method employing an SC method, it is essential to select an antenna having an optimum antenna weight from the plurality of transmitting antennas and to determine a form in which the optimum antenna weight is transmitted to the base station. Bearing this in mind, the operations of a mobile station will be described in detail. A mobile station (referred to as User Equipment (UE)) measures an optimum antenna weight from received channel information and feeds the result of measurement as feedback information back to a base station (referred to as UTRAN). Several embodiments will be described below.

In a first embodiment, a basis vector with respect to which maximum power is received is obtained using an orthonormal basis vector set, and an index corresponding to the basis vector is fed back.

1) A channel information matrix $H_{BW}$ obtained by transforming a receiving channel information matrix H using a transform matrix $B_w$ composed of an orthonormal basis vector set is calculated as follows.

$$H_{BW}=HB_w$$

Here, H=[h1 h2 h3 h4], $B_w$=[$b_w(0)$ $b_w(1)$ $b_w(2)$ $b_w(3)$], $h_1$ is a column vector composed of multi-path channels transmitted from a first antenna, and $b_w(i)$ is a basis vector corresponding to an i-th index in the basis vector set. In the case of a binary system, the amount of calculation can be reduced by using a Hadamard matrix transform. In the other cases, the performance can be increased by using a high-speed algorithm suitable for the characteristics of each transform matrix.

2) A norm of each column vector constituting the channel information matrix $H_{BW}$ is obtained. The values of norms are the value of receiving power measured with respect to the receiving channel information matrix H. The index of a basis vector corresponding to the maximum value among these values is the index of an orthonormal basis vector constituting an optimum weight.

3) The obtained index information is fed back to base station (UTRAN). The above steps are repeated at each slot.

For example, when four transmitting antennas are used, 16 combinations of a complex basis vector can be obtained from two basis vector sets. When the above steps are performed on each complex basis vector, a complex basis vector showing maximum power can be obtained, and an index of the complex basis vector can be transmitted to the base station.

In a second embodiment, S vectors among M orthonormal basis vectors are used.

1) For example, 4 orthonormal basis vectors exist with respect to 4 antennas. Accordingly, S is one of 1 to 4. The values of M and S are stored.

2) Antenna selection weights $w_{b,i}$ are prepared from the result of step 1. The antenna selection weights $w_{b,i}$ can be obtained by transforming antenna weights $w_i$ used in a base station having a transform matrix $B_w$ according to the equation $w_{b,i}=B_w w_i$. The antenna selection weights $w_{b,i}$ for antennas other than a selected antenna are 0.

3) A measured reception power $P_i=w_{b,i}^H H_{BW}^H H_{BW} w_{b,i}$ is calculated using the antenna selection weight $w_{b,i}$ and a channel information matrix $H_{BW}$. Here, the channel information matrix $H_{BW}$ is obtained by transforming a receiving channel information matrix H using a transform matrix $B_w$ composed of an orthonormal basis vector set.

4) Steps 2) and 3) are repeated for MCS cases, which is the number of cases in which S vectors can be selected from M basis vectors, MCS=M!/{(M-S)!S!}.

5) An antenna selection weight wb,i maximizing $P_i$ in step 3) is selected.

6) The antenna selection weight $w_{b,i}$ obtained in step 5) is used as approximated feedback information.

For example, when four transmitting antenna are used, the number of combinations of a complex basis vector obtained from two basis vector sets is 16. When two antennas are selected according to an SC method, weights and power are obtained with respect to $_{16}C_2$(=120) vector combinations, and then a combination of a basis vector maximizing the power is obtained. Antenna selection information and phase information as to the relative phase difference between the antennas may be included in feedback information.

In a third embodiment, a complex basis vector set is used, and the amount of feedback information is minimized. Here, a case of using four transmitting antennas will be explained as an example.

1) A channel information matrix $H_{BW}$ obtained by transforming a receiving channel information matrix H using a transform matrix $B_w$ composed of a Walsh basis vector set is calculated according to $H_{BW}=HB_w$. A channel information matrix $H_{BP}$ obtained by transforming the receiving channel information matrix H using a transform matrix $B_p$ composed of a polar basis vector set is calculated according to $H_{BP}=HB_P$. Here, H=[h1 h2 h3 h4], $B_w$=[$b_2(0)$ $b_w(1)$ $b_w(2)$ $b_w(3)$], $B_p$=[$b_p(0)$ $b_p(1)$ $b_p(2)$ $b_p(3)$], $h_1$ is a column vector composed of multi-path channels transmitted from a first antenna, $b_w(i)$ is a basis vector corresponding to an i-th index in the Walsh basis vector set, and $b_p(i)$ is a basis vector corresponding to an i-th index in the polar basis vector set.

2) It is assumed that $H_{ew}(i)$ indicates an i-th column vector in the matrix $H_{BW}$, and $H_{BP}(j)$ indicates a j-th column vector in the matrix $H_{BP}$. From this, a measured reception power $P^*(i,j)'2\|H_{ew}(i)+jH_{BW}(j)\|^2$ can be obtained for k=0, 1, 2, ..., 15. Here, I=0, 1, 2, 3 and j=0, 1, 2, 3.

3) Feedback information is generated based on k, i, and j which maximize the measured reception power. The above steps are repeated at each transmission slot.

Figure 4:
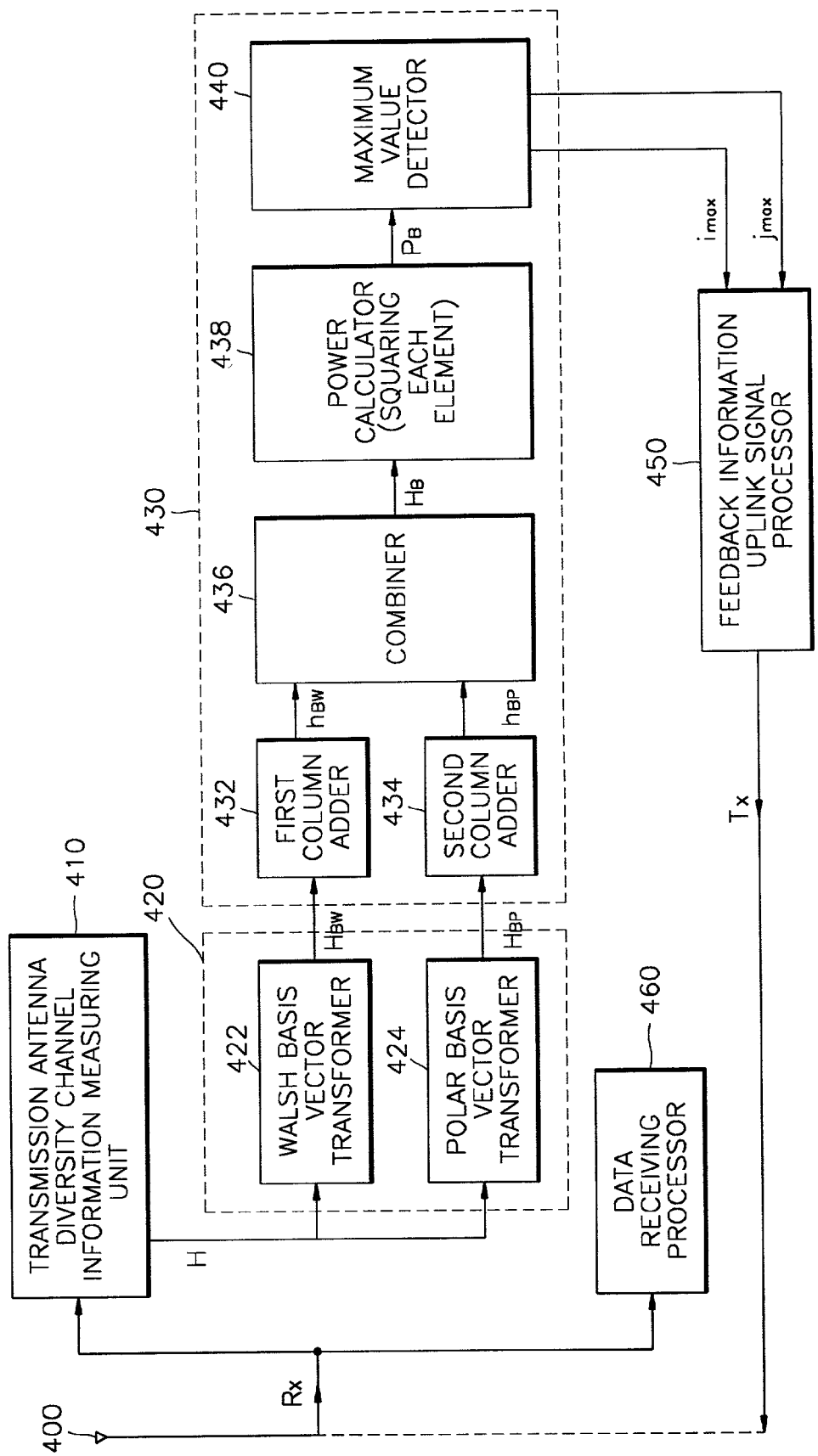
FIG. 4 illustrates a block diagram of an embodiment of a receiving apparatus for transmission antenna diversity in a wireless communication system.

FIG. 4 is a block diagram of an embodiment of a receiving apparatus for transmission antenna diversity. The above third embodiment will be described with reference to FIG. 4. A receiving apparatus includes an antenna 400, a transmission antenna diversity channel information measuring unit 410, a basis vector transformer 420 having a Walsh basis vector transformer 422 and a polar basis vector transformer 424, an optimum weight detector 430 having first and second column adders 432 and 434, a combiner 436, a power calculator 438 and a maximum value detector 440, a feedback information uplink signal processor 450, and a data receiving processor 460. The data receiving processor 460 decodes a signal received through the antenna 400 and restores transmitting data.

The transmission antenna diversity channel information measuring unit 410 measures channel information from a signal received through the antenna 400 and outputs the result of measurement in the form of a matrix. The output channel information matrix H is composed of L*M elements. "L" denotes the number of antennas, and "M" denotes the number of multi-path channels for each antenna. The Walsh basis vector transfer 422 transforms the channel information matrix H using a transform matrix composed of a Walsh complex basis vector set. The polar basis vector transformer 424 transforms the channel information matrix H using a transform matrix composed of a polar complex basis vector set.

The first column adder 432 sums the elements in all columns in each row in a matrix $H_{BW}$ output from the Walsh basis vector transformer 422 and outputs a row vector $H_{BW}(i)$ expressed by $$H_{BW}(i)=H_{BW}(i)\cdot 1_M.$$

Here, $1_M$ denotes a column vector whose length is M and whose elements are all 1.

The second column adder 434 sums the elements in all columns in each row in a matrix $H_{BP}$ output from the polar basis vector transformer 424 and outputs a row vector $h_{BP}(j)$ expressed by $$h_{BP}(j)=H_{BP}(j)\cdot 1_M.$$

The combiner 436 combines each of the row vectors $h_{BW}$ with each of the row vectors $h_{BP}$ and outputs a matrix $H_B$.

$$H_B(i,j)=h_{BW}(i)+jh_{BP}(j).$$

Here, i=1, 2, ..., L and j=1, 2, ..., L.

The power calculator 438 calculates the square of the modulus of each element of the combined matrix $H_B$ and outputs a power matrix $P_B$.

$$P_B(i,j)=|H_B(i,j)|^2$$

The maximum value detector 440 detects a maximum value from the power $P_B(i,j)$ with respect to each element and outputs an index (imax, jmax) of an element corresponding to the maximum value.

$$(i_{max}, j_{max})=\arg \max P_B(i,j)$$

The feedback information uplink signal processor 450 transforms the index $(i_{max}, j_{max})$ to be transmitted to a transmitting apparatus into a symbol configured according to a protocol suitable for feedback and transmits the symbol through the antenna 400.

In a transmission antenna diversity method, as described above, a mobile station finds an optimum antenna weight through measurement of a received channel. Here, a base station is required to send pilot signals discriminating antennas from one another for allowing the base station to measure a channel. To send different pilot signals for different antennas, a time division method, a frequency division method, or a code division method can be used. In the case of a Wideband Code Division Multiple Access (W-CDMA) standard, a method of using a multi-scrambling code, a multi-channelization code, or a multi-orthogonal pilot symbol pattern can be used to discriminate antennas from one another through pilot signals.

When two or more antennas are selected by a particular selection method, feedback information is transmitted in the order of selection information and phase information from a mobile station to a base station. In other words, bit data corresponding to the selection information is sent first to allow relevant basis vectors to be selected, and then the phase information indicating the relation between basis vectors is sent. In the case of a protocol configured in a frame unit, the selection information can be sent only in the first slot of a frame taking into account the property of a wireless fading environment in which the selection information scarcely changes but the phase information frequently changes. Here, when the selection information sent through the first slot of a frame is lost, the entire frame can be influenced. Accordingly, it is preferable to perform error correction coding on selection information data before transmission. Besides such a case, the selection information and phase information can be selectively or both error correction coded before transmission.

When feedback information in transmitted in a plurality of slots for transmission from a mobile station (UE), the feedback information can be transmitted by way of progressively refining channel information in every transmission slot. In other words, only a portion of current data that is different from data previously fed back is transmitted. When the moving speed of the mobile station is high, the state of a channel may change while feedback information is fed back during an interval of a plurality of slots so that the state of a channel may not match the feedback information. In such conditions, the progressive refining method is effective. When simultaneously transmitting antenna selection information and phase information, it is preferable not to use a progressively refining mode of partially changing an FSM in order to prevent errors in the antenna selection information. Although the entire antenna selection information and phase information fed back is not progressively refined, only the phase information can be conditionally refined according to the antenna selection information to improve the performance.

In the case of selecting three basis vectors from among four basis vectors to perform coherent phase correction in a four transmission antenna diversity system, offset between selected antennas makes the imbalance of power among the antennas worse when the phase correction values of the selected antennas are the same. To overcome this problem, a first basis vector is weighted by ½, a second basis vector is weighted by one of $\exp(J^*\pi/4)$, $\exp(j^*2^*\pi/2+\pi/4)$, $\exp(j^*3^*\pi/2+\pi/4)$, and $\exp(j^*4^*\pi/2+\pi/4)$, and a last basis vector is weighted by one of $\exp(j^*\pi/2+\pi/8)$, $\exp(j^*2^*\pi/2+\pi/8)$, $\exp(j^*3^*\pi/2+\pi/8)$, and $\exp(j^*4^*\pi/2+\pi/8)$. Here, the number of cases of possible phases of each antenna is 4. Even when the number of antennas increases, the imbalance of power among the antennas can be minimized by rotating the constellation of phase correction values, which are multiplied by respective basis vectors, by a predetermined degree.

A transmitting apparatus and a receiving apparatus according to the present invention in a transmission antenna diversity system was described with reference to the attached drawings. As described above, a complex basis vector set is used for transmitting an optimum weight in a preferred embodiment of the present invention. Hereinafter, a case using a complex basis vector set will be described in detail.

A mobile station (UE) calculates an antenna weight to be applied to an access point of a transmitting antenna of a base station (UTRAN) in order to maximize reception power at the UE. For example, common pilot channels (CPICH) transmitted from four transmitting antennas are used for the calculation (see FIG. 1). When four transmitting antennas are used, an antenna weight is one complex basis vector includes in a set of 16 complex basis vectors and is determined according to diversity employing an SC method. A real axis and an imaginary axis in a complex basis vector are composed of different orthonormal basis vectors. FIGS. 5A through 5C show examples of a basis vector set on the real axis, a basis vector set on the imaginary axis, and a complex basis vector set obtained by combining the two basis vector sets.

For each slot, the mobile station (UE) calculates an index corresponding to an optimum weight, that is, an index I corresponding to one complex basis vector selected from among the 16 complex basis vectors. Since basis vectors are alternately transmitted such that a real basis vector is transmitted in one slot and an imaginary basis vector is transmitted in the next slot, the index I transmitted at a time is one of numerals 0, 1, 2, 3, and 4 and is represented by EN-bit data. When an index is represented by a binary value Ibin, the relation between the binary value and I is expressed by $$I_{bin} = \begin{cases} 00_{(2)}, & \text{if } I = 0 \\ 01_{(2)}, & \text{if } I = 1 \\ 10_{(2)}, & \text{if } I = 2 \\ 11_{(2)}, & \text{if } I = 3 \end{cases}$$

Here, I is a value used as an index value in FIGS. 5A and 5B showing the lists of orthonormal basis vectors. Each binary value $I_{bin}$ is sequentially transmitted to the base station (UTRAN) through an FSM field. When $I_{bin}$=00(2), 0 is sent as a most significant bit (MSB) and as a least significant bit (LSB). When Ibin=01$_{(2)}$, 0 is sent as an MSB and 1 is sent as an LSB. When =10$_{(2)}$, 1 is sent as an MSB and 0 is sent as an LSB. When $I_{bin}$=11$_{(2)}$, 1 is sent as an MSB and as an LSB. Two-bit data is transmitted for a single slot time.

The base station (UTRAN) analyzes received feedback information according to FIG. 6. FIG. 6 shows the mapping relation between basis vectors bw and bp and the received feedback information (FSM) at each slot number. In FIG. 6, $b_w(i)$ is a vector corresponding to an i-th index in FIG. 5A, and $b_p(i)$ is a vector corresponding to an i-th index in FIG. 5B.

An antenna weight (a vector $w=w_{re}+jw_{im}$) calculated by the feedback information decoder 140 of the base station shown in FIG. 1 is a sliding window average of basis vectors received for the interval of two consecutive slots. The vectors "w" is expressed by the following equation according to an algorithm.

$$\underline{w}(n)=\underline{w}_{re}(n)+j\underline{w}_{im}(n)$$

Here, $\underline{w}_{re}(n)=\underline{b}_w(2\lfloor n/2 \rfloor)$, and $\underline{w}_{im}(n)=\underline{b}_p(2\lfloor (n-1)/2 \rfloor)$.

FIG. 7 shows parameters and their values used for transmission antenna diversity employing a selection method using complex basis vectors when four antennas are used. In FIG. 7, in the case of a wireless protocol configured in a frame-slot structure as in the UMTS W-CDMA standard, a duration time in a slot is the time length of a single slot. The number of basis sets for basis rotation is the number of basis sets which are used. One basis vector set is used for a real axis, and another basis vector set is used for an imaginary axis. A feedback command length in slots is the number of slots occupied by a single command (information) to be used for determination of a weight. The number of selection index bits per signaling word is the number of bits necessary for representing selection information and is two when the number of antennas is four. The number of feedback information bits per slot is the number of bits of feedback information in a single slot. A feedback command update rate is an interval at which feedback information is updated in a register of the base station. A feedback bit rate is information as to how many bits are fed back per second.

As described above, the present invention allows powers to be equally distributed to transmitting antennas and maintains excellent performance at a high speed of movement, thereby minimizing the cost of configuring an RF processor. Particularly, by using information received in two consecutive slots, the present invention can be more reliably adapted to a channel at a low speed of movement. In addition, as for an extended selective combining method of selecting a plurality of antennas and coherently combining them, the present invention provides methods for improving the performance, thereby optimizing the performance. Accordingly, according to the present invention, hardware can be configured at a low cost, performance is excellent at a high speed of movement, and reliable channel adaptation can be accomplished at a low speed of movement, thereby maximizing channel capacity and link performance in a wireless mobile communication environment. The present invention can be applied to mobile communication systems such as CDMA-2000 systems and UMTS systems using a CDMA mode.

A preferred embodiment of the present invention has been disclosed herein and, although specific terms are employed, they are used in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. A closed loop transmission antenna diversity method employing a selective combining method when a plurality of antennas are used in a base station of a mobile communication system, the closed loop transmission antenna diversity method comprising the steps of:
    (a) measuring channel information from signals transmitted from the plurality of antennas used in the base station and outputting a channel information matrix;
    (b) transforming the channel information matrix according to a transform matrix composed of a complex basis vector set;

(c) calculating reception power with respect to the plurality of antennas based on the transformed channel information matrix; and (d) transmitting antenna selection information obtained based on the calculated reception power to the base station as feedback information for controlling transmission antenna diversity.

2. The closed loop transmission antenna diversity method of claim 1, wherein the step (a) comprises measuring channel information using pilot signals set differently for the plurality of antennas.

3. The closed loop transmission antenna diversity method of claim 1, wherein the step (b) comprises the sub steps of:

(b1) calculating a first transformed channel information matrix from the channel information matrix using a transform matrix composed of a first basis vector set; and (b2) calculating a second transformed channel information matrix from the channel information matrix using a transform matrix composed of a second basis vector set, and the step (c) comprises the sub steps of:

(c1) calculating reception power based on the first and second transformed channel information matrices; and (c2) detecting an element maximizing the reception power in the complex basis vector set.

4. The closed loop transmission antenna diversity method of claim 3, wherein the first and second basis vector sets are a Walsh basis vector set and a polar basis vector set, respectively.

5. The closed loop transmission antenna diversity method of claim 1, wherein the step (d) comprises alternately transmitting two indexes corresponding to a real part and an imaginary part, respectively, of a complex basis vector at feedback signaling intervals when an index corresponding to a basis vector included in the complex basis vector set is transmitted as the feedback information.

6. The closed loop transmission antenna diversity method of claim 1, wherein in the step (d) the feedback information signal comprises antenna selection information and phase information indicating a phase difference between antennas.

7. A closed loop transmission antenna diversity method employing a selective combining method, comprising the steps of:

(a) receiving in a base station selection information related to a complex basis vector from a mobile station;

(b) determining a complex basis vector selected based on the selection information;

(c) obtaining an antenna weight for each antenna using the determined complex basis vector; and (d) generating a signal based on the antenna weight and transmitting the signal to the mobile station through a corresponding antenna.

8. The closed loop transmission antenna diversity method of claim 7, comprises the additional steps after step b):

(b1) receiving an index corresponding to an element of a complex basis vector set as the feedback information; and (b2) selecting a complex basis vector corresponding to the index received in step (b1) by referring to a weight table in which an index is assigned to each element of a complex basis vector set composed of all combinations of first and second basis vector sets.

9. The closed loop transmission antenna diversity method of claim 7, wherein the step (a) comprises separately receiving as the feedback information the real part and imaginary part of an index corresponding to an element of a complex basis vector set for two feedback signaling intervals, and combining the real part and the imaginary part by way of sliding window.

10. The closed loop transmission antenna diversity method of claim 8, wherein the first and second basis vector sets are a Walsh basis vector set and a polar basis vector set, respectively.

11. In a mobile communication system, a base station apparatus, having a plurality of antennas for a closed loop transmission antenna diversity method employing a selective combining method, comprising:

a plurality of antennas for receiving selection information related to a complex basis vector from a mobile station as feedback information;

a feedback information decoder for determining a complex basis vector selected based on the selection information and obtaining an antenna weight for each antenna using the determined complex basis vector; and a data transmitting unit for generating a signal based on the antenna weight and transmitting the signal to the mobile station through a corresponding antenna.

12. A mobile station apparatus for a closed loop transmission antenna diversity method employing a selective combining method when a plurality of antennas are used in a base station of a mobile communication system, the mobile station apparatus comprising:

a channel information measuring unit for measuring channel information from signals transmitted through the plurality of antennas used in the base station and outputting a channel information matrix;

a basis vector transformer for transforming the channel information matrix according to a transform matrix composed of a complex basis vector set;

an optimum weight detector for calculating reception power with respect to the plurality of antennas based on the transformed channel information matrix and generating feedback information for antenna selection based on the calculated reception power; and an uplink signal processor for transmitting the feedback information to the base station in the form of a symbol configured according to a protocol suitable for feedback.

13. The mobile station apparatus of claim 12, wherein the basis vector transformer comprises:

a Walsh basis vector transformer for transforming the channel information matrix using a transform matrix composed of a Walsh basis vector set; and a polar basis vector transformer for transforming the channel information matrix using a transform matrix composed of a polar basis vector set.

14. The mobile station apparatus of claim 12, wherein the optimum weight detector comprises:

first and second column adders each for adding elements in all columns in each row in the transformed channel information matrix and outputting a row vector;

a combiner for combining the outputs of the first and second column adders in all possible cases and outputting a combination matrix;

a power calculator for calculating power with respect to each element of the combination matrix; and a maximum value detector for detecting a maximum value of the power with respect to each element and outputting an index of an element corresponding to the maximum value.

15. The mobile station apparatus of claim 12, wherein the uplink signal processor transmits antenna selection information and phase information as the feedback information.

16. The closed loop transmission antenna diversity method of claim 1, wherein the complex basis vector set is an orthonormal vector set.

17. The closed loop transmission antenna diversity method of claim 7, wherein the complex basis vector set is an orthonormal vector set.

18. The closed loop transmission antenna diversity method of claim 11, wherein the complex basis vector set is an orthonormal vector set.

19. The mobile station apparatus of claim 12, wherein the complex basis vector set is an orthonormal vector set.

* * * * *